(12) United States Patent
Martin

(10) Patent No.: US 10,176,899 B2
(45) Date of Patent: Jan. 8, 2019

(54) SPACERS WITH DEFLECTION-LIMITED ROD CONTACTS FOR NUCLEAR FUEL ASSEMBLIES AND METHODS OF MAKING THE SAME

(75) Inventor: Kathryn M. Martin, Wilmington, NC (US)

(73) Assignee: Global Nuclear Fuel-Americas, LLC, Wilmington, NC (US)

( * ) Notice: Subject to any disclaimer, the term of this patent is extended or adjusted under 35 U.S.C. 154(b) by 1970 days.

(21) Appl. No.: 13/603,184

(22) Filed: Sep. 4, 2012

(65) Prior Publication Data

US 2014/0064434 A1 Mar. 6, 2014

(51) Int. Cl.
G21C 3/34 (2006.01)
G21C 3/336 (2006.01)
G21C 3/356 (2006.01)

(52) U.S. Cl.
CPC ............ G21C 3/336 (2013.01); G21C 3/3563 (2013.01); G21C 3/3424 (2013.01); Y02E 30/40 (2013.01)

(58) Field of Classification Search
CPC ........ G21C 3/34; G21C 3/3408; G21C 3/348; G21C 3/352; G21C 3/356; G21C 3/3563
USPC ......................................... 376/438, 442, 462
See application file for complete search history.

(56) References Cited

U.S. PATENT DOCUMENTS

| | | | |
|---|---|---|---|
| 3,654,077 A | 4/1972 | Lass et al. | |
| 3,715,275 A * | 2/1973 | Krawiec | G21C 3/3563 376/438 |
| 3,890,196 A | 6/1975 | Chetter | |
| 4,028,180 A * | 6/1977 | Finch | G21C 3/3563 376/442 |
| 4,058,436 A | 11/1977 | Anthony | |
| 4,152,205 A | 5/1979 | Kropfl | |
| 4,314,884 A | 2/1982 | Fanning | |
| 4,411,862 A | 10/1983 | Leclercq et al. | |
| 4,879,090 A | 11/1989 | Perrotti et al. | |

(Continued)

FOREIGN PATENT DOCUMENTS

EP 1845533 A1 10/2007
JP S60238042 A 11/1985

(Continued)

OTHER PUBLICATIONS

FR Search Report issued in connection with corresponding French Patent Application No. 1358195 dated Jun. 17, 2014.

(Continued)

*Primary Examiner* — Marshall P O'Connor
(74) *Attorney, Agent, or Firm* — Ryan Alley IP

(57) ABSTRACT

Nuclear fuel spacers include a deflection-limited elastic rod contact. Spacers may additionally include a rigid contact without elastic functionality. A degree of deflection may be chosen based on plastic deformation threshold, maximum fuel rod movement, anticipated transverse loads related to fuel assembly, inspection, handling, transportation, operation, accidents, and/or any other operating characteristic. Spacers include deflection-limited elastic contacts and/or rigid contacts in several arrangements within the spacer and/or on a single fuel rod. Spacers are compatible with a simple fabrication method that forms rigid, deflection-limiting, and elastic components from a single substrate. Nuclear fuel spacers are useable with several fuel assembly types.

16 Claims, 5 Drawing Sheets

(56) References Cited

U.S. PATENT DOCUMENTS

| | | | |
|---|---|---|---|
| 4,923,669 A | 5/1990 | DeMario | |
| 6,144,716 A | 11/2000 | Nguyen et al. | |
| 6,473,482 B1 | 10/2002 | Steinke | |
| 2003/0012329 A1 | 1/2003 | Yoon | |
| 2004/0196954 A1 | 10/2004 | Stabel-Weinheimer | |
| 2005/0226358 A1 | 10/2005 | Bonnamour | |
| 2006/0056574 A1 | 3/2006 | Kemner | |
| 2007/0242793 A1* | 10/2007 | Song | G21C 3/356 376/438 |
| 2009/0257546 A1 | 10/2009 | Lu et al. | |

FOREIGN PATENT DOCUMENTS

| | | | |
|---|---|---|---|
| JP | 6472095 A | 3/1989 | |
| JP | 2001512562 A | 8/2001 | |
| JP | 2002508075 A | 3/2002 | |
| JP | 2009258106 A | 11/2009 | |
| JP | 2011013216 A | 1/2011 | |
| KR | 200900010443 A | 1/2009 | |

OTHER PUBLICATIONS

Unofficial English translation of Office Action issued in connection with corresponding SE Application No. 1351022-7 dated Mar. 13, 2015.

Unofficial English translation of Japanese Office Action issued in connection with corresponding JP Application No. 2013-175114 dated May 26, 2015.

Unofficial English translation of Office Action issued in connection with corresponding JP Application No. 2013175114 dated Jun. 7, 2016.

Office Action issued in connection with corresponding SE Application No. P41303738SE00, dated Aug. 24, 2017 with unofficial English translation.

Office Action issued in connection with corresponding JP Application No. 2013175114, dated Sep. 28, 2015 with unofficial English translation.

Office Action issued in connection with corresponding SE Application No. P41303738SE00, dated Feb. 26, 2018 with unofficial English translation.

* cited by examiner

# SPACERS WITH DEFLECTION-LIMITED ROD CONTACTS FOR NUCLEAR FUEL ASSEMBLIES AND METHODS OF MAKING THE SAME

BACKGROUND

FIG. 1 is a sectional illustration of a conventional nuclear reactor fuel assembly 10 typically used in commercial light water nuclear reactors for electricity generation throughout the world. Several fuel assemblies 10 are shipped to and placed in a reactor in close proximity to sustain a nuclear chain reaction. A fluid moderator and/or coolant conventionally passes through fuel assembly 10 in an axial direction, enhancing the chain reaction and/or transporting heat away from the assembly 10.

As shown in FIG. 1, fuel assembly 10 includes multiple fuel rods 14 containing fissile material and extending in the axial direction within the assembly 10. Fuel rods 14 are bounded by a channel 12 that forms an exterior of the assembly 10, maintaining fluid flow within assembly 10 throughout the axial length of assembly 10. Conventional fuel assembly 10 also includes one or more conventional fuel spacers 18 at various axial positions. Fuel spacer 18 permits fuel rods 14 to pass through grid-like openings in spacer 18, thereby aligning and spacing fuel rods 14. One or more water rods 16 or other assembly features may also pass through spacer 18, and grid size and shape, and the overall shape of spacer 18 may vary across different designs of assembly 10.

FIG. 2 is an illustration of a related art fuel spacer 18 from an axial direction. As shown in FIG. 2, conventional spacer 18 includes several grid openings 41, which may be formed by several unioned internal spans 42. Perimeter band 49 may enclose spacer 18 and include one or more bathtubs 44 that contact channel 12 (FIG. 1). As shown in FIG. 2, several fuel rods 14 may pass through spacer 18 through corresponding grid openings 41, when used in an assembly. Grid openings 41 may be of a substantially similar size and positioned in rectilinear fashion as shown in FIG. 2, or may be positioned and sized differently to accommodate other fuel designs. For example, grid openings 41 for water rods 16 may be larger than grid openings 41 for smaller fuel rods 14. Alternatively, all grid openings 41 may be a same size, and one or more rod contacts 46 may be used to bring fuel rods 14 into rigid contact with spacer 18 if grid openings 41 are larger than a diameter of fuel rod 14. For example, rod contacts 46 may be attached to one or more sidewalls 45 of grid opening 41 and extend inward to contact fuel rod 14 and rigidly connect fuel rod 14 to spacer 18 in a transverse direction.

SUMMARY

Example embodiments include nuclear fuel spacers that sit along axial positions of a fuel assembly and surround/align fuel rods that pass therethrough. Example embodiment spacers include a specialized rod contact with an elastic component and an associated limiting component that limits deflection of the elastic component. The elastic component may be embodied in several diverse ways, including as a curved protrusion with a length to minimally contact the fuel rod. Limiting components are similarly diverse, and may include a curved protrusion with a length shorter than the elastic component to allow some movement of the fuel rod against the elastic component before being halted, such as by contact with the deflection component. The degree of permitted movement may be approximately a threshold for plastic deformation of the elastic component or any other desired criteria. Elastic and deflection-limiting components may be arranged and related in several different ways in example embodiments, including a central, axial extending elastic component connecting at two axial ends to the spacer, with deflection limiters at either axial end. Example embodiment fuel spacers may further include a rigid stop without any corresponding elastic component. Example embodiment fuel spacers may include specialized rod contacts in any number and pattern based on fuel assembly design, desired operating characteristics, and anticipated loads and shocks. Example embodiment fuel spacers may be rectilinear with square grid openings having specialized rod contacts extending in fours from each inner wall of each opening, for example. In such an example, specialized rod contacts may include a combination of rigid stops and elastic components positioned around each fuel rod. Example embodiments include nuclear fuel assemblies with spacers through which several rods pass, each contacted by a desired combination of deflection-limited and rigid contacts at different points about each rod.

Example methods include fabricating and using nuclear fuel assemblies and spacers with deflection-limited elastic components. Example methods may include stamping internal pieces of spacers to form the piece and elastic and/or rigid/deflection-limiting pieces together, so that a simplified fabrication method is achieved and spacer internals are integral and continuous. Various components can be further stamped or thinned to provide rigidity and desired levels of elasticity based on fuel needs.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
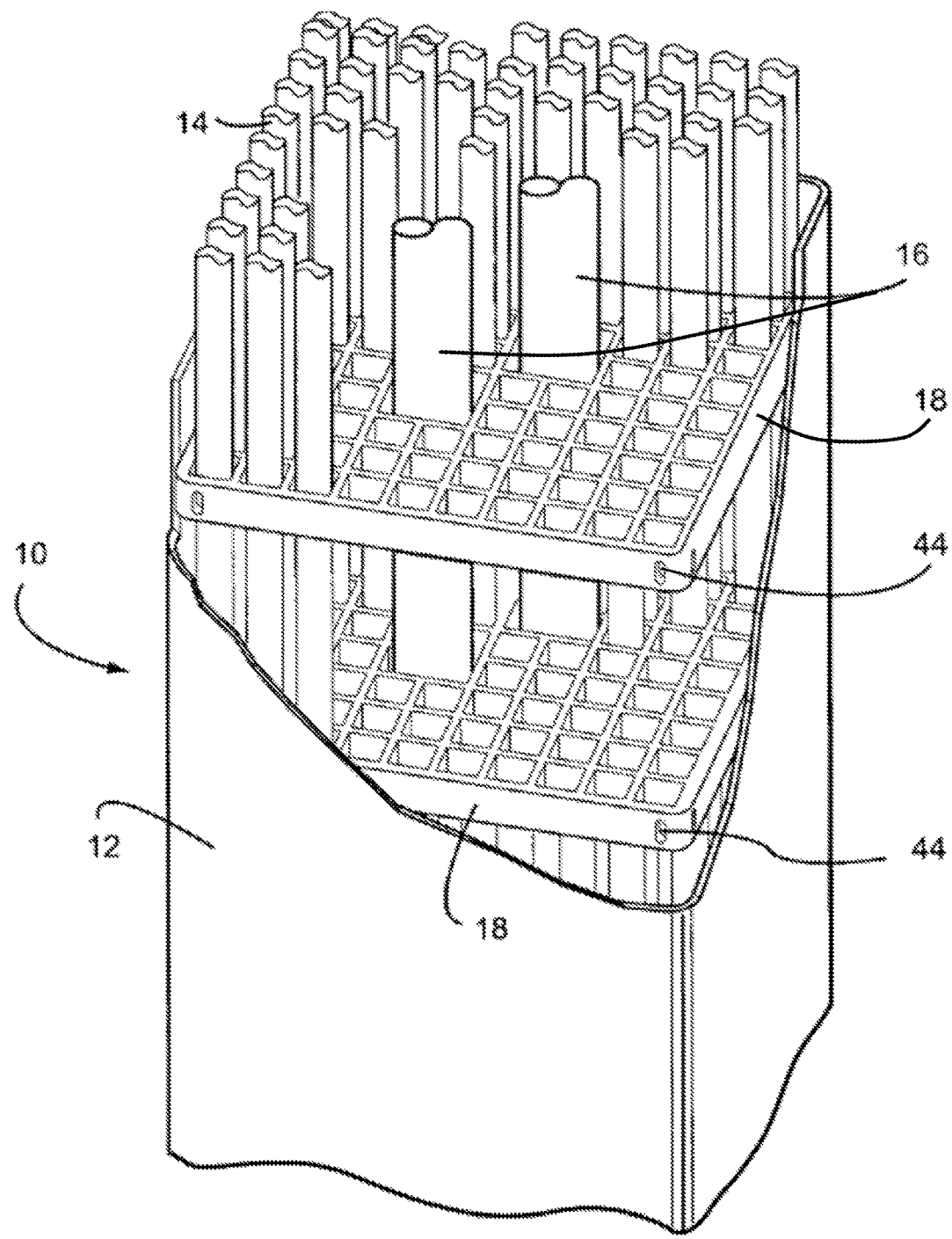
FIG. 1 is an illustration of a section of a conventional nuclear fuel assembly.

This is a patent document, and general broad rules of construction should be applied when reading and understanding it. Everything described and shown in this document is an example of subject matter falling within the scope of the appended claims. Any specific structural and functional details disclosed herein are merely for purposes of describing how to make and use example embodiments. Several different embodiments not specifically disclosed herein fall within the claim scope; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.). Similarly, a term such as "communicatively connected" includes all variations of information exchange routes between two devices, including intermediary devices, networks, etc., connected wirelessly or not.

As used herein, the singular forms "a", "an" and "the" are intended to include both the singular and plural forms, unless the language explicitly indicates otherwise with words like "only," "single," and/or "one." It will be further understood that the terms "comprises", "comprising,", "includes" and/or "including", when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

Applicants have recognized that fuel assemblies are subjected to a variety of shocks and strains over their lifetime, including shipping, installation, handling, seismic events, and power generation, that cover a wide array of transverse force profiles on the assembly. As such, although it is desirable to maintain fuel rods in a particular positions in a fuel assembly for fluid flow, neutronics, and handling purposes, rigid and direct contact between the spacer and fuel rods may increase the risk of damage to the spacer or fuel rods when the assembly is subjected to certain transverse loads, such as sudden impact events or intense vibration, for example. Further, Applicants have recognized that a rigid connection between spacer and fuel rods may cause damage during axial movement of the spacer relative to the fuel rods during fuel assembly and disassembly processes, and/or may result in plastic deformation of internal spacer features or fuel rods during certain transverse load events, potentially damaging the assembly. On the other hand, purely elastic connections between spacer and fuel rods may result in less predictable spacing of the fuel rods when the assembly is subjected to certain transverse loads, resulting in plastic deformation of such elastic connections and/or poor fuel rod positioning. Elastic connections may also have unacceptably large transverse cross-sections in order to provide necessary elastic force, reducing coolant flow and rod-coolant heat transfer. Example embodiments described below address these and other problems recognized by Applicants with unique solutions enabled by example embodiments.

The present invention is fuel spacers, fuel assemblies having spacers, and methods of forming and using the same, where the spacers include a rod contact that provides elastic force to a fuel rod to a degree and is deflection limited thereafter. This may avoid permanent deformation of the elastic member, achieve desired fuel rod spacing, simplify fabrication, and/or achieve several other desired characteristics. Specific example embodiments are discussed below that illustrate examples of how this may be done.

Figure 2:
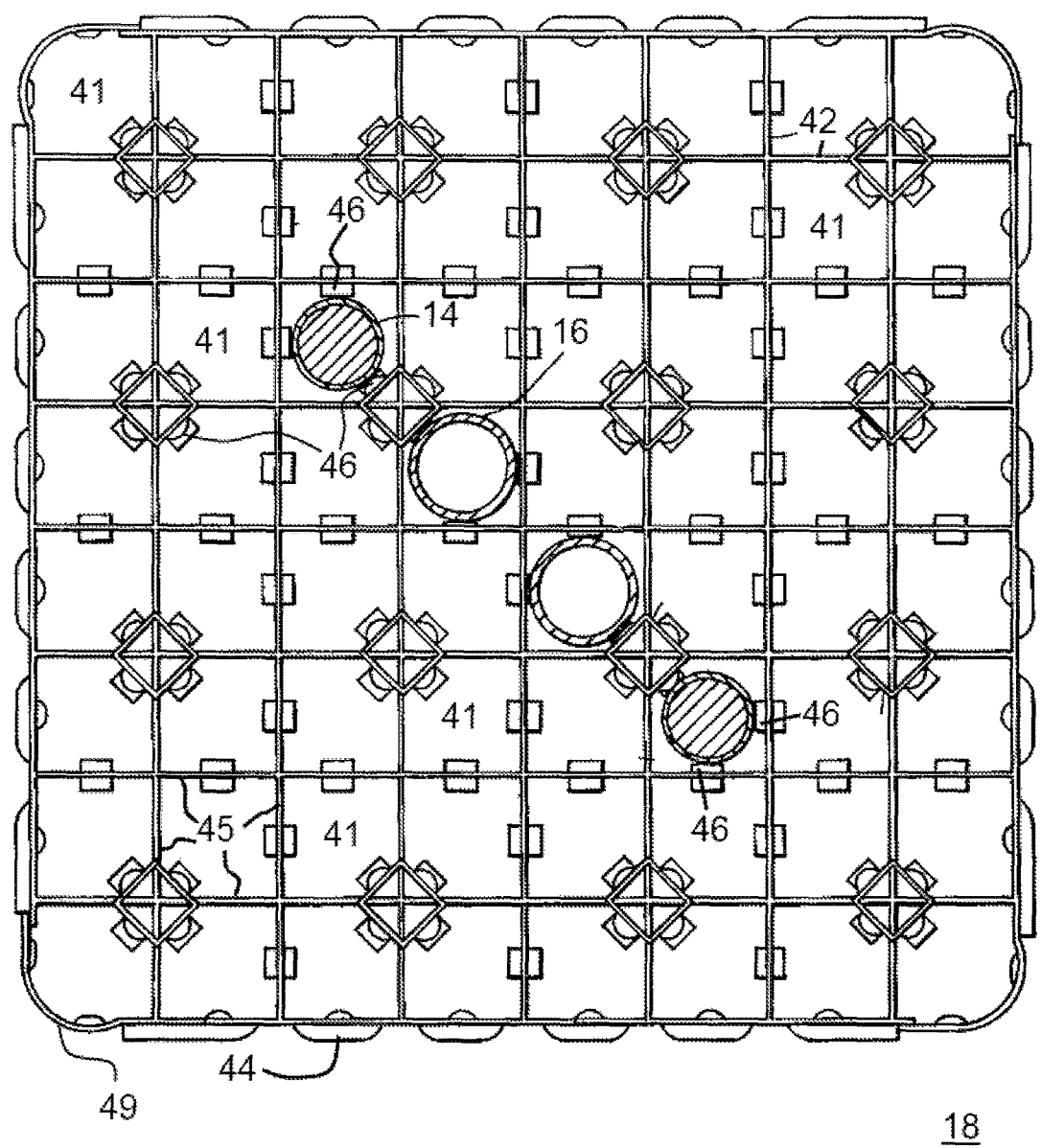
FIG. 2 is an illustration of a related art fuel spacer from an axial direction.
Figure 3:
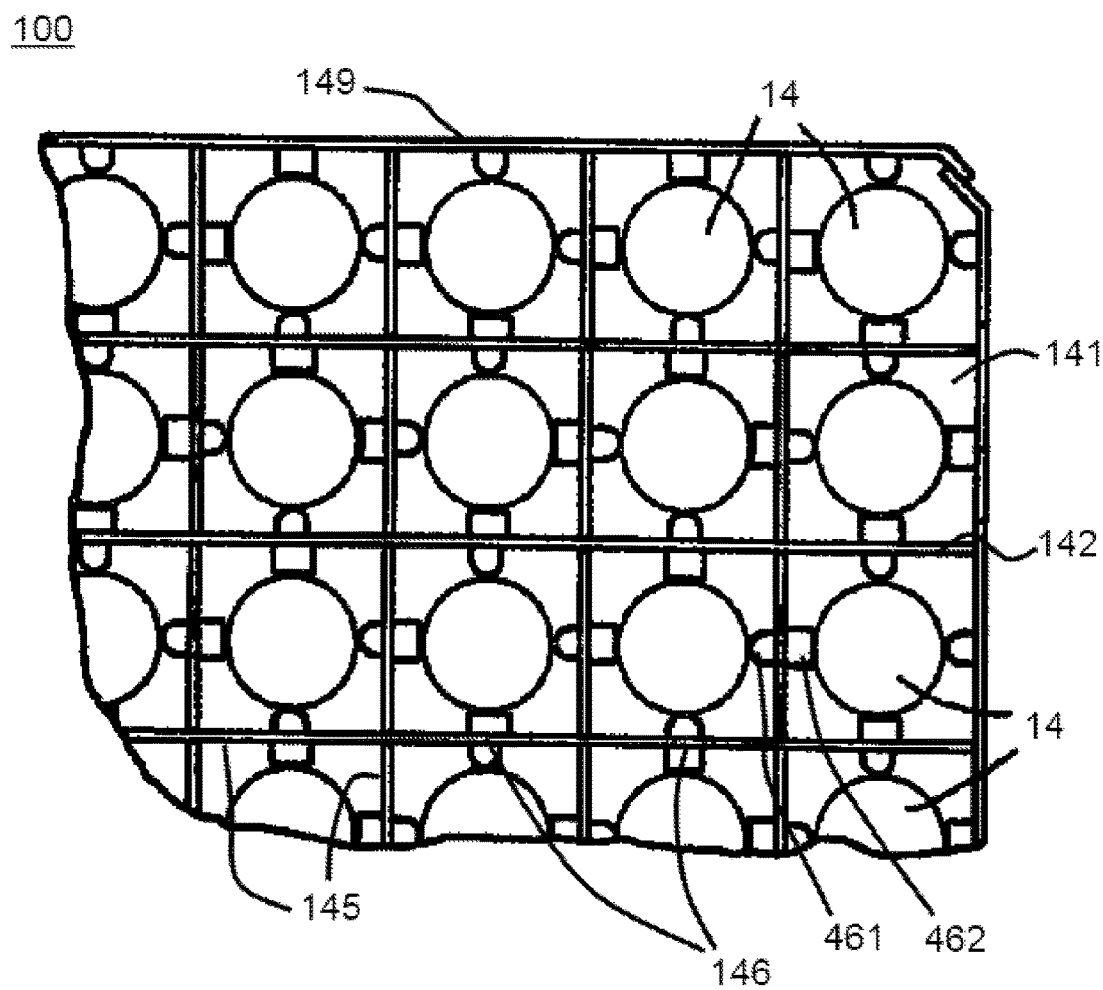
FIG. 3 is an illustration of an example embodiment fuel spacer from an axial direction.

FIG. 3 is an illustration of a section of a profile of an example embodiment fuel spacer 100. As shown in FIG. 3, example embodiment fuel spacer 100 may include several features of, and be useable with or in place of, related fuel spacers, such as those shown in FIGS. 1 and 2. Fuel spacer may include several internal grid openings 141 formed by internal spans 142 within an outer perimeter band 149. Fuel rods 14 may pass through example embodiment fuel spacer 100 through grid openings 141, with one or more internal walls 145 of grid openings 141 not directly contacting a corresponding rod 14. Non-shown portions of example embodiment fuel spacer 100 may be similar to the portion shown in FIG. 3, so as to convey all of example embodiment spacer 100 with any arbitrary number of grids 141 and fuel rods 14. Although the specific example of FIG. 3 is shown in a rectilinear shape and layout like related art spacers of FIGS. 1 and 2, it is understood that other geometries, sizes, and grid opening layouts are understood and useable as example embodiments. Example embodiment fuel spacer 100 may include other features, such as flow tabs, swirl vane mixers, debris filters, bathtubs etc. that permit the spacer to be useable with several types of fuel assemblies through appropriate or known variation.

As shown in FIG. 3, example embodiment fuel spacer 100 includes an example embodiment rod contact 146 that contacts fuel rod 14 by extending transversely (the horizontal or vertical direction in the example of FIG. 3) from inner wall 145 of grid opening 141. Example embodiment rod contact 146 includes at least one of a rigid stop 462 and a deflection-limited elastic contact 461. Rigid stop 462 generally prevents relative movement of a contacted fuel rod 14 toward a nearest inner wall 145 from which rigid stop 462 extends. Deflection-limited elastic contact 461 is flexible and provides some, but not complete, movement of a contacted fuel rod 14 toward a nearest inner wall 145 from which deflection-limited elastic contact 461 extends. That is, deflection-limited elastic contact 146 provides a distance or clearance that fuel rod 14 may move toward an internal wall 145 while being subject to only restorative, elastic force but beyond which fuel rod 14 is subject to a rigid blocking force. This clearance or degree of movement may be selected based on a spring constant of deflection-limited elastic contact 461, a desired minimum distance between fuel rod 14 and inner wall 145, shocking forces expected to be encountered by a fuel assembly including the same in transport, use, or accident, and/or the plastic threshold of deflection-limited elastic contact 461.

Any number of specialized rod contacts 146 may be placed in a grid opening 141. For example, if a grid opening 141 has four inner walls 145, one specialized rod contact 146 may extend from each wall 145 to provide four specialized rod contacts 146 in contact with a fuel rod 14.

Alternatively, multiple or no specialized rod contacts 146 may also be present on any given inner wall 145, and any number of inner walls 145, including a single, circular ferrule-like inner wall 145, may be used in example embodiment spacers. As such, a single specialized rod contact 146 in a single grid opening 141 may be present in example embodiment spacers, up to dozens of specialized rod contacts 146 in up to every grid opening 141 in other example embodiments.

Specialized rod contacts 146 may be arranged to provide fuel rods 14 with desired damping characteristics. For example, as shown in FIG. 3, two deflection-limited elastic contacts 461 may extend from two perpendicular walls 145, while two rigid stops 462 may extend from opposite perpendicular walls 145 in a given grid opening 141. The example arrangement of FIG. 3 may thus provide deflection-limited elastic forces in two perpendicular transverse directions and rigid forces in two other perpendicular directions. Of course, other arrangements, including all deflection-limited elastic resistance from deflection-limited elastic contacts 461 in one or all directions, a single rigid contact from a single direction, and/or different mixes of elastic, rigid, and/or no contact from any number of sides across different grid openings 141 are useable in example embodiment spacers. Nuclear fuel engineers can use example embodiment spacers with varying rigid and elastic rod contacts to achieve a wide degree of support and response to fuel rods spaced by example embodiments, achieving desired levels of support and/or damping based on rod position within a spacer, bundle, and/or core, based on anticipated operating and shipping shock magnitudes and direction, based on steady-state vibration conditions, etc.

If specialized rod contacts 146 uses two opposite contacts, such as both a deflection-limited elastic contact 461 and a rigid stop 462 as shown in FIG. 3, specialized rod contact 146 may contact a plurality of fuel rods 14 in different grid openings 141 extending on both sides of an internal span 142. In the example of FIG. 3, specialized rod contact includes a rigid stop 462 providing a rigid contact to one fuel rod 14 in one grid opening 141 and an opposite deflection-limited elastic contact 461 providing a flexible, restorative contact to another fuel rod 14 in an adjacent grid opening 141.

Figure 4:
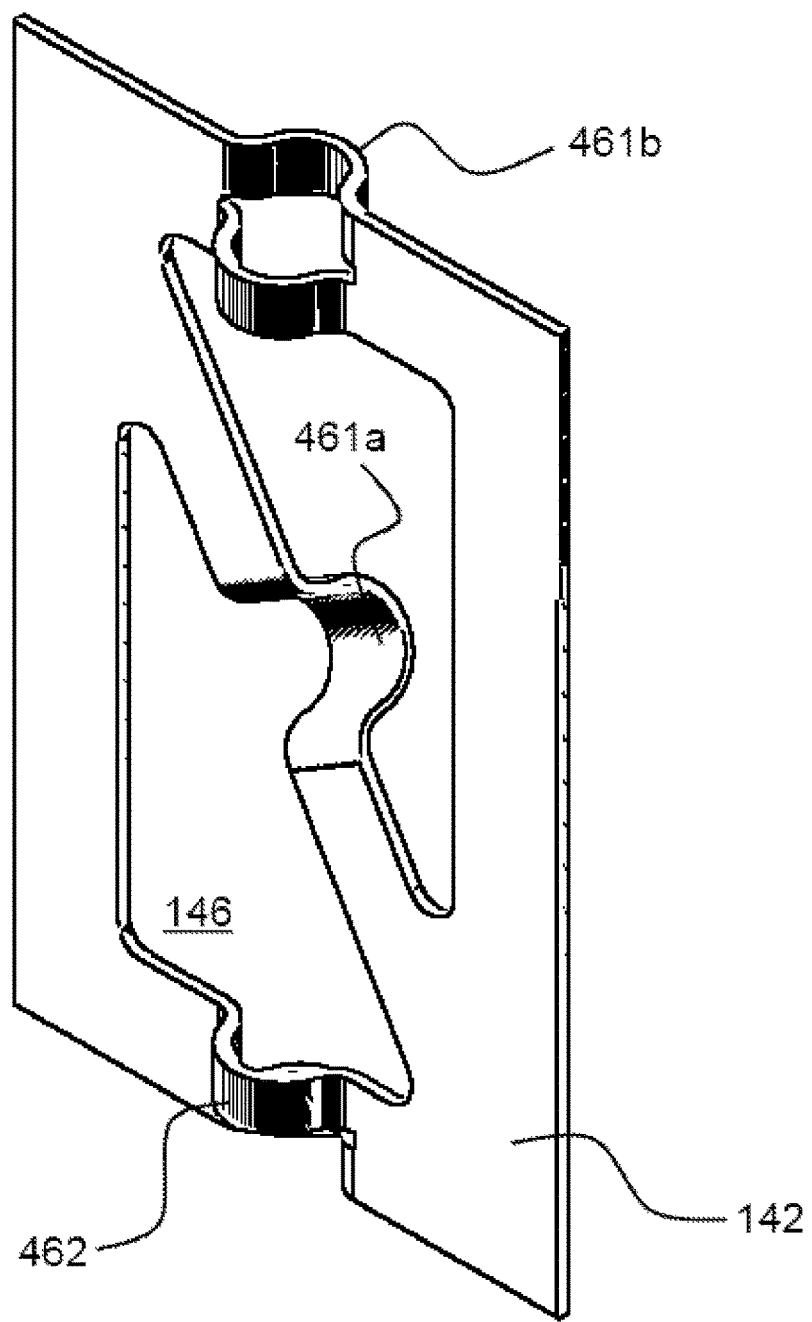
FIG. 4 is an illustration of an example embodiment specialized rod contact.

Specialized rod contact 146 may be embodied in several ways in to provide desired rigid and/or deflection-limited elastic contact characteristics to fuel rods supported thereby. FIG. 4 is an example embodiment showing a particular arrangement for a specialized rod contact 146 that provides both rigid contact and deflection-limited elastic contact to adjacent fuel rods. As shown in FIG. 4, example embodiment specialized rod contact 146 includes an elastic contact 461a that may be a spring or extension having a transverse length sufficient to contact a fuel rod positioned in a cell with specialized rod contact 146. Elastic contact 461a may be have rounded edges and have a relatively thin profile so as to have minimal debris capture and/or blocking effect on fluid flowing over a rod and specialized rod contact 146 in the axial direction. Elastic contact 461a may further be shaped to minimize a hydraulic profile of example spacers in which it is useable by being thin and elongated in the axial direction (the vertical direction in the example of FIG. 4) while extending minimally in the transverse direction (the horizontal direction in the example of FIG. 5) so as to minimally block fluid flow while still providing the desired resistive force.

Elastic rod contact 461a may be formed of any material compatible with an operating nuclear reactor environment, including zircaloys, aluminum alloys, stainless steels, and/or nickel alloys such as X-750. Elastic contact 461a may be formed to a thinness and other dimensions to provide a desired spring constant and/or plastic deformation threshold based on any number of criteria including position in core, fuel rod characteristics, anticipated loads and vibrations, etc. Because elastic contact 461a may provide a flexible, restorative force to a contacting fuel rod with only a relatively narrow/thin curved contact area, the potential for fouling, corrosion, and/or debris capture between elastic contact 461a and a fuel rod can be minimized.

Figure 5:
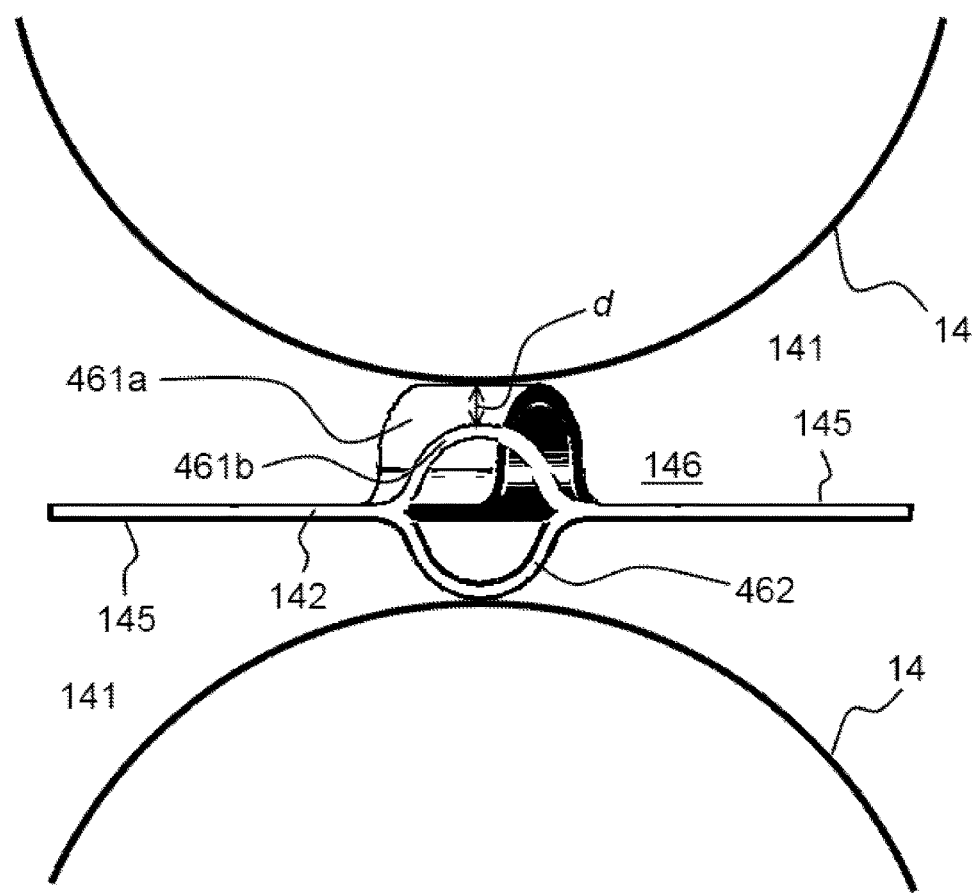
FIG. 5 is a sectional illustration of an example embodiment fuel spacer from an axial direction showing a detail of an example embodiment specialized rod contact.

Example embodiment specialized rod contact 146 also includes a deflection limiter 461b extending in the transverse direction from interior span 142. Deflection limiter 461b is comparatively rigid, and, if pushed into contact with a fuel rod, will largely prevent any further movement of fuel rod toward an inner wall 145 (FIG. 3) of a spacer in which it is used. As shown in FIG. 5, deflection limiter 461b extends toward a fuel rod a shorter distance than a corresponding elastic contact 461a. In this way, deflection limiter 461b provides a clearance d that fuel rod 14 may move toward an internal wall 145 of an example embodiment spacer while being subject to only the restorative force of elastic resistive contact 461a. Clearance d may be selected based on a spring constant of elastic contact 461a, a desired minimum distance between example embodiment spacers and fuel rods 14, shocking forces expected to be encountered by a fuel assembly including the same in transport, use, or accident, and/or the plastic deformation threshold of elastic contact 461a.

For example, d may be a distance less than a plastic deformation threshold of elastic contact 461a, such that elastic contact 461a will maintain a sufficient spring constant and length, and thus functionality, even following a severe transverse force that causes deflection limiter 461b to come into direct contact with fuel rod 14. In the alternative or additive, for example, d may be a maximum distance between an internal span 142 in an example embodiment spacer and an internal surface of fuel rod 14 in order to preserve desired levels of flow or other thermo-hydraulic properties of a fuel assembly containing the same. As shown in FIG. 4, multiple deflection limiters 461b may be used, one on each axial side of elastic contact 461a. In all these and other ways, deflection limiter 461b may rigidly prevent further relative movement between spacer elements and fuel rods 14 in desired combinations with permitted relative movement between the same that is resisted and reversed by elastic contact 461a.

Example embodiment specialized rod contact 146 may further include a rigid stop 462 that provides a rigid, secure contact to a fuel rod. As shown in FIGS. 4 and 5, rigid stop 462 may be similar to deflection limited 461b but unpaired with any elastic member that contacts a same fuel rod. For example, rigid stop 462 may also be a thin, rounded extension of a transverse length to provide rigid support to a fuel rod 14 contacted thereby. In this way, rigid stop 462 may also present a minimal flow blockage and/or debris entrapment profile while contacting a minimal area of fuel rod 14. For example, as shown in FIG. 5, a lateral width of rigid stop 462, elastic contact 461a, and deflection limiter 461b may be approximately 0.1 inches or less. Rigid stop 462 and deflection limiter 461b may extend in relatively opposite transverse directions to provide respective minimum required spacing between fuel rods 14 in adjacent grid openings 141. Rigid stop 462 and deflection limiter 461b may be relatively thicker than elastic contact 461a and supported more directly from inner span 142 in order to have relatively little elasticity and provide desired rigidity and movement limitation. Similarly, rigid stop 462 and/or deflection limiter 461b, along with other parts of example embodiment specialized rod contact 146 may be fabricated from any material compatible with an operating nuclear reactor environment, including zircaloys, aluminum alloys, stainless steels, and/or nickel alloys such as X-750.

Specialized rod contacts 146 may be formed from inner spans 142 through a stamping or molding fabrication process that requires no additional parts or connections to inner spans 142 and thus creates a simplified, lighter-weight example embodiment spacer 100. For example, inner spans 142 may be fabricated through a stamping process that provides an amount of material and sets a thickness of inner spans 142 at, for example, approximately 0.010 inch thickness or greater. Elastic contact 462 may be formed thereafter by expanding, stamping, and/or thinning desired portions of inner span 142 and or removing portions of inner span 142, such as in the case of example embodiment specialized rod contact 146 shown in FIGS. 4 and 5 having sections of inner span 142 removed about elastic contact 462. Or, for example, elastic contact 461a may be formed by welding a leaf spring to inner span 142 or otherwise attached to inner span 142. Specialized rod contacts 146 and other elements of example embodiment fuel spacers 100 may be heat treated or age-hardened following fabrication.

Deflection limiter 461b and rigid stop 462, like elastic contact 461a, may be formed by stamping or molding inner spans 142 during manufacturing of example embodiment spacers. In this way, the manufacturing process may be simplified, requiring no additional parts or connectors and minimizing weight of example embodiment spacers using specialized rod contacts. Deflection limiters 461b and rigid stops 462 may be stamped with formation of inner span 142 so as to retain an original thickness, with little or no thinning of the material. Alternatively, deflection limiters 461b and rigid stops 462 may be separate rigid pieces welded or otherwise attached to inner spans 142.

Although shown in a specific arrangement in FIGS. 4 and 5, and in a layout within an example embodiment spacer 100 in FIG. 3, deflection-limited elastic contact 461 may have elastic and deflection-limiting members arranged in several different configurations, and example embodiment specialized rod contacts 462 can be positioned and oriented in several different manners and include different components. For example, example embodiment spacers may include a ring-type deflection limiter 462 encircling an elastic contact 461, deflection limiters 462 spaced at regular intervals between elastic contacts 461a on inner span 142, etc. Thus, as long as a desired inner wall 145 includes an elastic contact 461a and deflection limiter 461b operable together to prevent plastic deformation of elastic contact 461a, the spacer includes a deflection-limited elastic rod contact 146.

Example embodiments and methods thus being described, it will be appreciated by one skilled in the art that example embodiments may be varied and substituted through routine experimentation while still falling within the scope of the following claims. For example, although some example embodiments are described with specialized rod contacts in certain positions and with rigid and elastic features in opposite rectilinear grid openings, it is understood that example embodiment spacers may include any combination and positioning of an elastic member and deflection limiter. Further, it is understood that example embodiments and methods can be used in connection with any type of fuel and reactor where axial spacers are used to align fuel rods. Such variations are not to be regarded as departure from the scope of the following claims.

What is claimed is:

1. A fuel spacer for use in a nuclear fuel assembly, the spacer comprising:
   at least one internal member forming an internal opening configured to receive a fuel rod and secure the fuel rod within the spacer; and
   a rod contact extending from the internal member and having a transverse length to contact a fuel rod passing through the opening, wherein the rod contact includes an elastic resistive member and a corresponding deflection limiter, wherein the deflection limiter has a transverse length shorter than the elastic resistive member such that the fuel rod and elastic resistive member must move toward the internal member in the transverse direction to contact the deflection limiter, and wherein a difference between the transverse length of the deflection limiter and the transverse length of the elastic resistive member is approximately equal to a threshold for plastic deformation of the elastic resistive member.

2. The fuel spacer of claim 1, wherein the elastic resistive member includes a curved protrusion configured to contact the fuel rod at only an apex of the curve.

3. The fuel spacer of claim 1, wherein the deflection limiter includes two curved extensions extending in the transverse direction on each axial side of the elastic resistive member.

4. The fuel spacer of claim 1, wherein the elastic resistive member is connected to the internal member only at two axial ends.

5. The fuel spacer of claim 1, further comprising:
   at least one rigid stop extending from the internal member and having a transverse length to contact the fuel rod passing through the opening.

6. The fuel spacer of claim 1, further comprising:
   a plurality of the internal members, wherein the internal members are internal spans extending a length or width of the fuel spacer, and wherein the internal members are unioned to form a plurality of the openings.

7. The fuel spacer of claim 6, wherein the unioned internal spans intersect at right angles and form a plurality of openings that are square grid openings.

8. The fuel spacer of claim 6, further comprising:
   a plurality of the rod contacts extending from the internal spans in each of the openings; and
   a plurality of rigid stops extending from the internal spans in each of the openings opposite a corresponding one of the rod contacts, wherein each of the rigid stops has a transverse length to contact the fuel rod passing through the opening.

9. A nuclear fuel assembly comprising:
   a plurality of fuel rods containing nuclear fuel and extending in an axial direction; and
   a spacer through which the fuel rods pass, wherein the spacer includes,
      a plurality of internal members forming a plurality of internal openings and each of the fuel rods passes through a corresponding one of the internal openings, and
      at least one rod contact extending into one of the internal openings and having a transverse length to contact the fuel rod passing through the opening, wherein the rod contact includes an elastic resistive member and a corresponding deflection limiter, wherein the deflection limiter has a transverse length shorter than the elastic resistive member such that the fuel rod and elastic resistive member must move toward the internal member in the transverse direction to contact the deflection limiter, and wherein a difference between the transverse length of the deflection limiter and the transverse length of the elastic resistive member is approximately equal to a threshold for plastic deformation of the elastic resistive member.

10. The fuel assembly of claim 9, wherein the spacer further includes a plurality of the rod contacts, and wherein the rod contacts extend into a plurality of the internal openings.

11. The fuel assembly of claim 10, wherein each of the rod contacts further include a rigid stop that extends into an opening adjacent to an opening into which the elastic resistive member and the corresponding deflection limiter extend.

12. The fuel assembly of claim 11, wherein each of the fuel rods is contacted at a first point by one of the elastic resistive members, at a second point by another of the elastic resistive members, at a third point by one of the rigid stops, and at a fourth point by another of the rigid stops, and wherein the first, second, third, and fourth points are distributed about the fuel rod at a 90-degree interval, and wherein the first point is opposite the third point on the fuel rod.

13. The fuel assembly of claim 11, wherein each elastic resistive member, rigid stop, and deflection limiter is without material interruption with one of the internal members.

14. The fuel assembly of claim 9, wherein the elastic resistive member includes a curved protrusion configured to contact the fuel rod at only an apex of the curve.

15. A fuel spacer for use in a nuclear fuel assembly, the spacer comprising:
a plurality of internal members forming a plurality of internal openings each configured to receive a fuel rod and secure the fuel rod within the spacer, wherein each of the internal members includes,
a rod contact having an elastic resistive member and a corresponding deflection limiter, wherein the elastic resistive member extends a first transverse length into one opening of the plurality of internal openings formed by the internal member to contact the fuel rod passing through the one opening, wherein the corresponding deflection limiter extends a second transverse length into the one opening, and wherein the second transverse length is shorter into the one opening than the first transverse length so that the corresponding deflection limiter will not contact the fuel rod centered in the one opening; and
a band surrounding the plurality of internal members.

16. The fuel spacer of claim 15, wherein the elastic resistive member is flexible so as to allow movement of the fuel rod to the deflection limiter in a direction opposite the transverse length, wherein deflection limiter is rigid so as to stop further movement of the fuel rod in the direction, and wherein at least one of the elastic resistive member and the deflection limiter is convex into the one opening with greatest transverse extension into a center of the one opening.

* * * * *